United States Patent
Katsuta

(10) Patent No.: US 11,264,879 B2
(45) Date of Patent: Mar. 1, 2022

(54) IN-WHEEL MOTOR

(71) Applicant: TODA RACING CO., LTD., Okayama (JP)

(72) Inventor: Tomonori Katsuta, Okayama (JP)

(73) Assignee: TODA RACING CO., LTD., Okayama (JP)

( * ) Notice: Subject to any disclaimer, the term of this patent is extended or adjusted under 35 U.S.C. 154(b) by 207 days.

(21) Appl. No.: 16/498,044

(22) PCT Filed: Mar. 9, 2018

(86) PCT No.: PCT/JP2018/009298
§ 371 (c)(1),
(2) Date: Sep. 26, 2019

(87) PCT Pub. No.: WO2018/180379
PCT Pub. Date: Oct. 4, 2018

(65) Prior Publication Data
US 2021/0104942 A1    Apr. 8, 2021

(30) Foreign Application Priority Data
Mar. 27, 2017 (JP) .............................. JP2017-060756

(51) Int. Cl.
*H02K 29/03* (2006.01)
*B60K 7/00* (2006.01)
(Continued)

(52) U.S. Cl.
CPC ............ *H02K 29/03* (2013.01); *B60K 7/0007* (2013.01); *H02K 1/2786* (2013.01); *H02K 1/28* (2013.01);
(Continued)

(58) Field of Classification Search
CPC ............ H02K 29/03; H02K 1/27; H02K 1/28; H02K 21/22; H02K 7/006; H02K 1/2786;
(Continued)

(56) References Cited

U.S. PATENT DOCUMENTS 9,172,278 B2 * 10/2015 Nakano .................. H02K 29/03
2014/0191628 A1 * 7/2014 Nakano ................ H02K 11/225
310/68 B
(Continued)

FOREIGN PATENT DOCUMENTS

CN          101795041 A       8/2010
CN          204089387 U       1/2015
(Continued)

OTHER PUBLICATIONS

International Search Report issued in Application No. PCT/JP2018/009298 dated Jun. 5, 2018.
(Continued)

*Primary Examiner* — Naishadh N Desai
(74) *Attorney, Agent, or Firm* — Pearne & Gordon LLP

(57) ABSTRACT

An in-wheel motor, comprising: a rotor (14) of a surface permanent magnet type, wherein a plurality of permanent magnets (15) are fixed along an inner circumferential surface of the rotor; wedge-shaped protrusions (42) for fixing the permanent magnets (15) on the rotor (14); and a stator (30) disposed inside the rotor (14), wherein teeth (35) and slots (36) are alternately formed on an outer circumferential portion of the stator; wherein the number of the permanent magnets (15) is 32, and the number of the slots 36 is 24; wherein each of the permanent magnets (15) has chamfers (43) on each of the ends so that a magnetic flux cannot concentrate, and is convex toward the stator (30), in a cross-section perpendicular to a rotary axis of the rotor (14).

6 Claims, 14 Drawing Sheets

(51) Int. Cl.
*H02K 1/2786* (2022.01)
*H02K 1/28* (2006.01)
*H02K 7/00* (2006.01)
*H02K 21/22* (2006.01)

(52) U.S. Cl.
CPC ............ *H02K 7/006* (2013.01); *H02K 21/22* (2013.01); *B60K 2007/0038* (2013.01); *B60K 2007/0092* (2013.01); *H02K 2213/03* (2013.01)

(58) Field of Classification Search
CPC .... H02K 2213/03; B60K 7/00; B60K 7/0007; B60K 2007/0038; B60K 2007/0092; Y02T 10/64
See application file for complete search history.

(56) References Cited

U.S. PATENT DOCUMENTS

| | | | |
|---|---|---|---|
| 2015/0008786 A1* | 1/2015 | Endo | H02K 1/2786 310/216.069 |
| 2015/0357892 A1* | 12/2015 | Nakano | H02K 1/278 180/443 |
| 2016/0241108 A1* | 8/2016 | Kimura | H02K 1/2753 |

FOREIGN PATENT DOCUMENTS

| | | |
|---|---|---|
| CN | 204497936 U | 7/2015 |
| JP | 3-116634 A | 5/1996 |
| JP | 11-136893 A | 5/1999 |
| JP | 2006-094604 A | 4/2006 |
| JP | 2010-158130 A | 7/2010 |
| JP | 2013-128341 A | 6/2013 |
| JP | 2013-176202 A | 9/2013 |
| JP | 2015-89224 A | 5/2015 |

OTHER PUBLICATIONS

Written Opinion issued in Application No. PCT/JP2018/009298 dated Jun. 5, 2018.

\* cited by examiner

[FIG. 1]
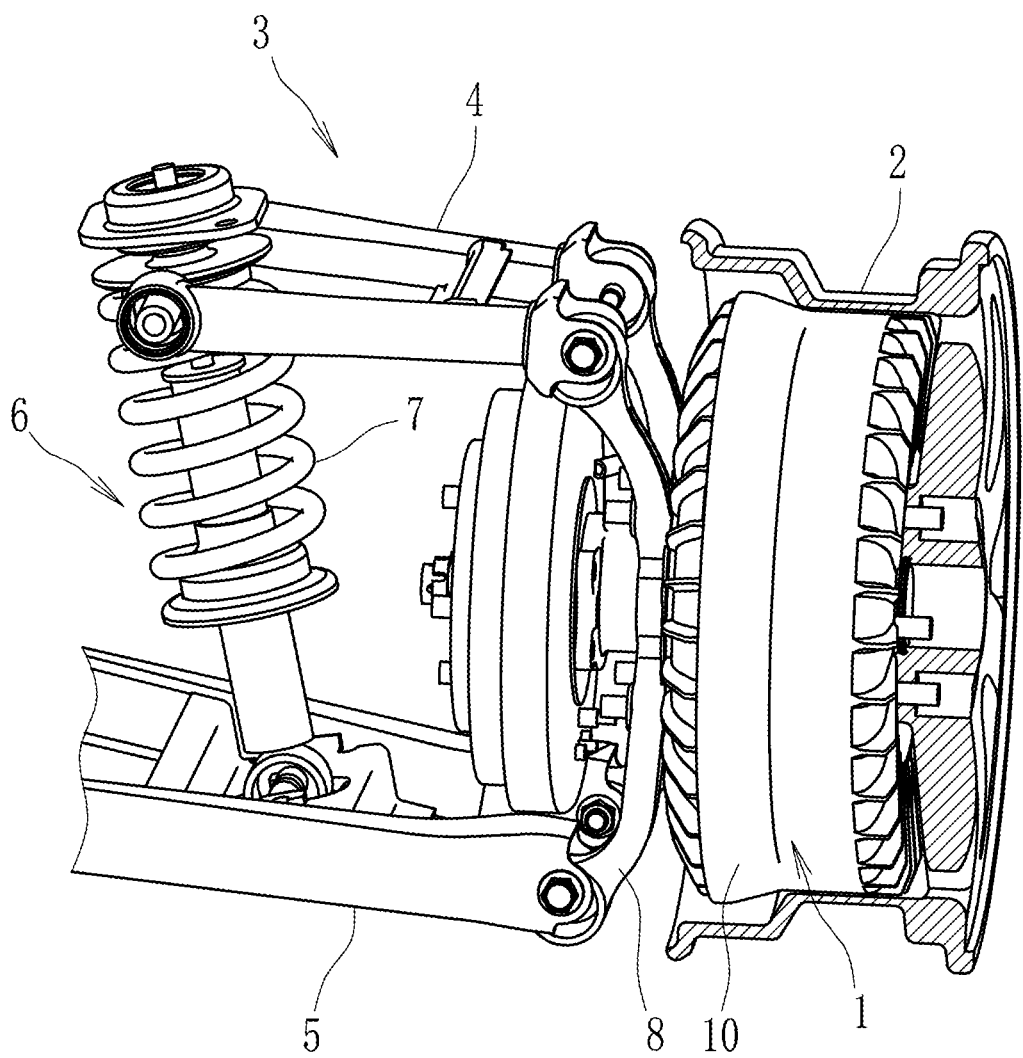

[FIG. 2]
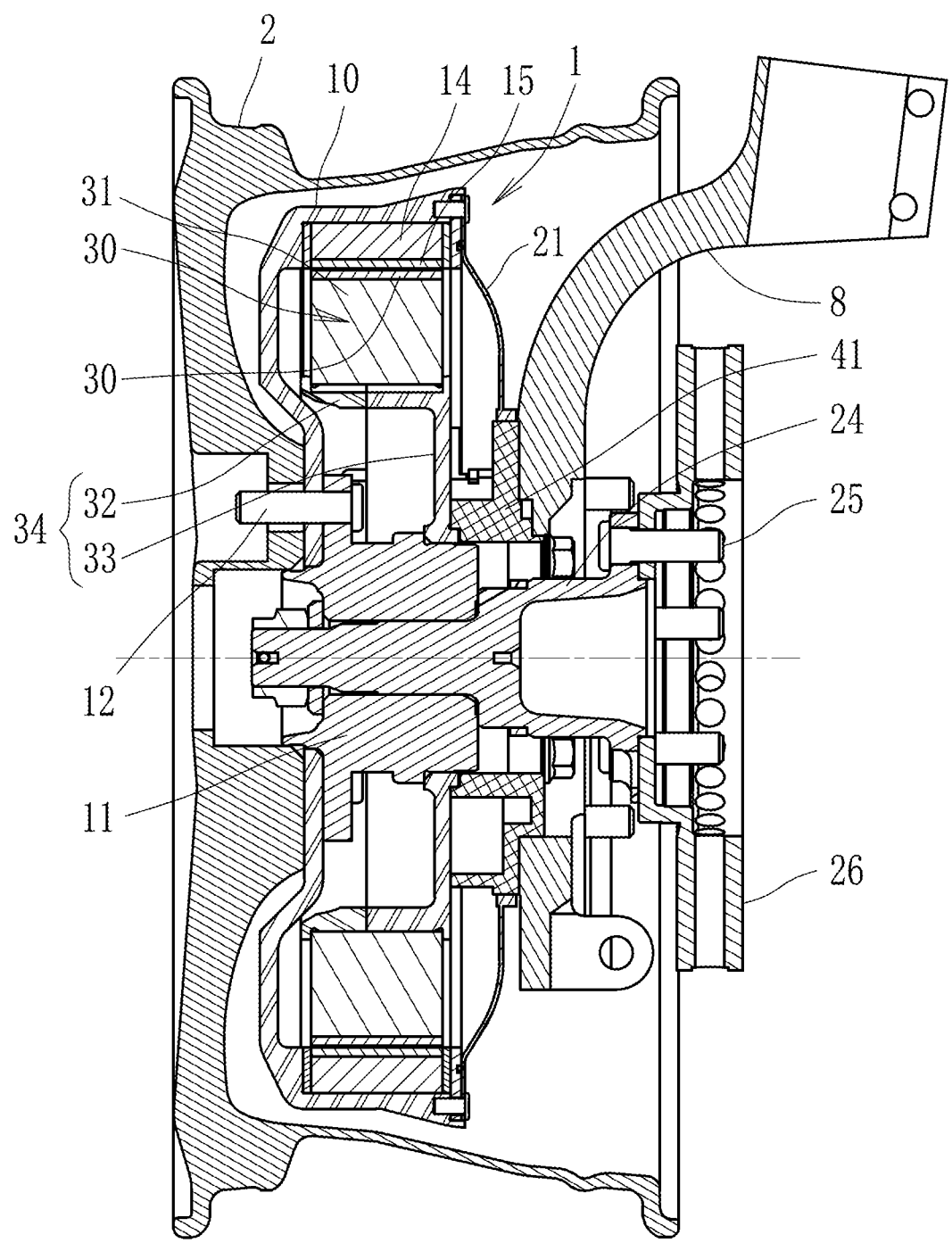

[FIG. 3]
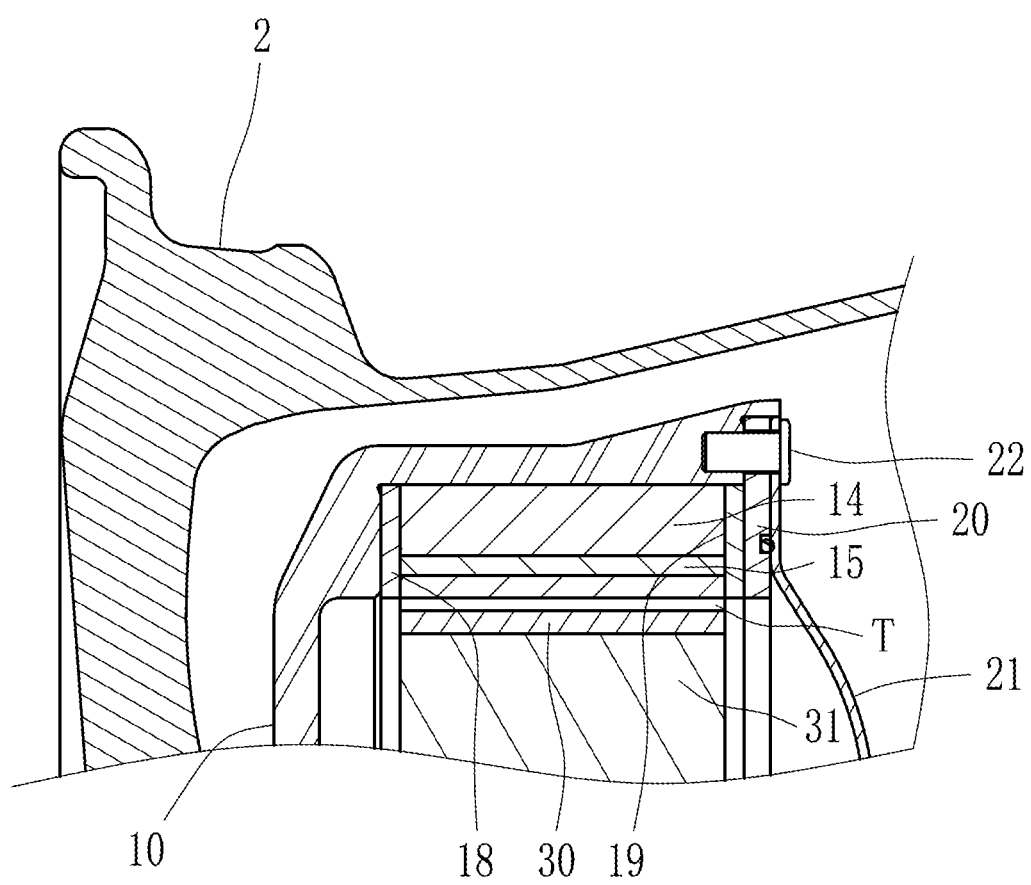

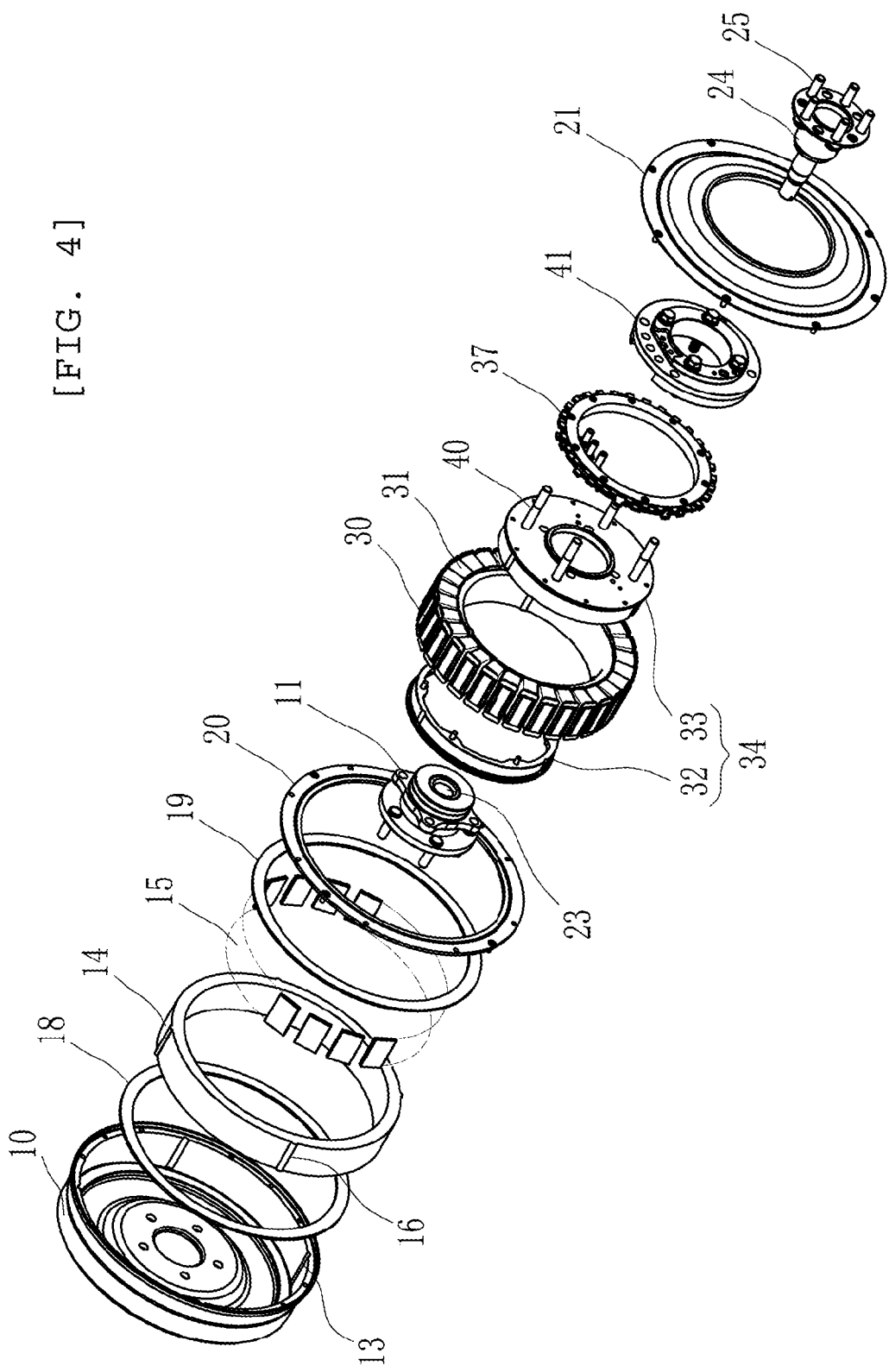

[FIG. 5]
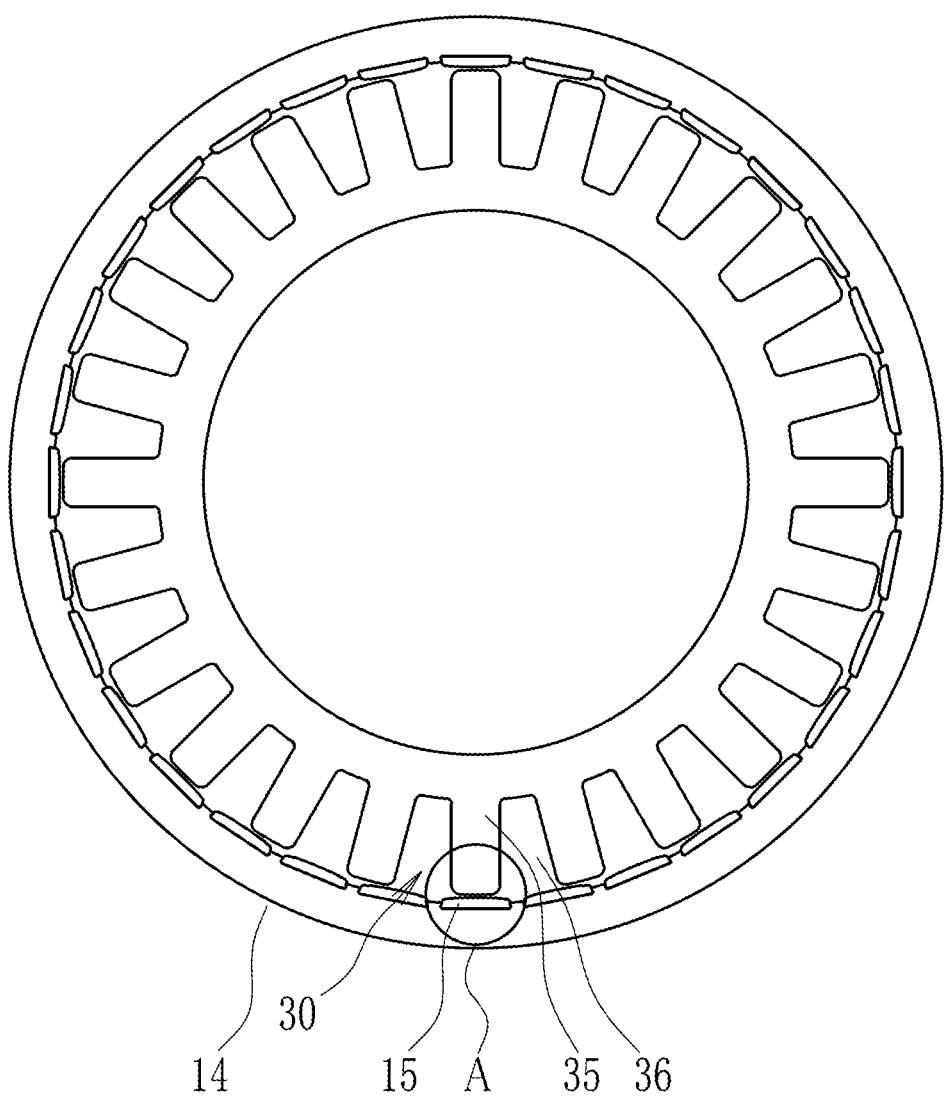

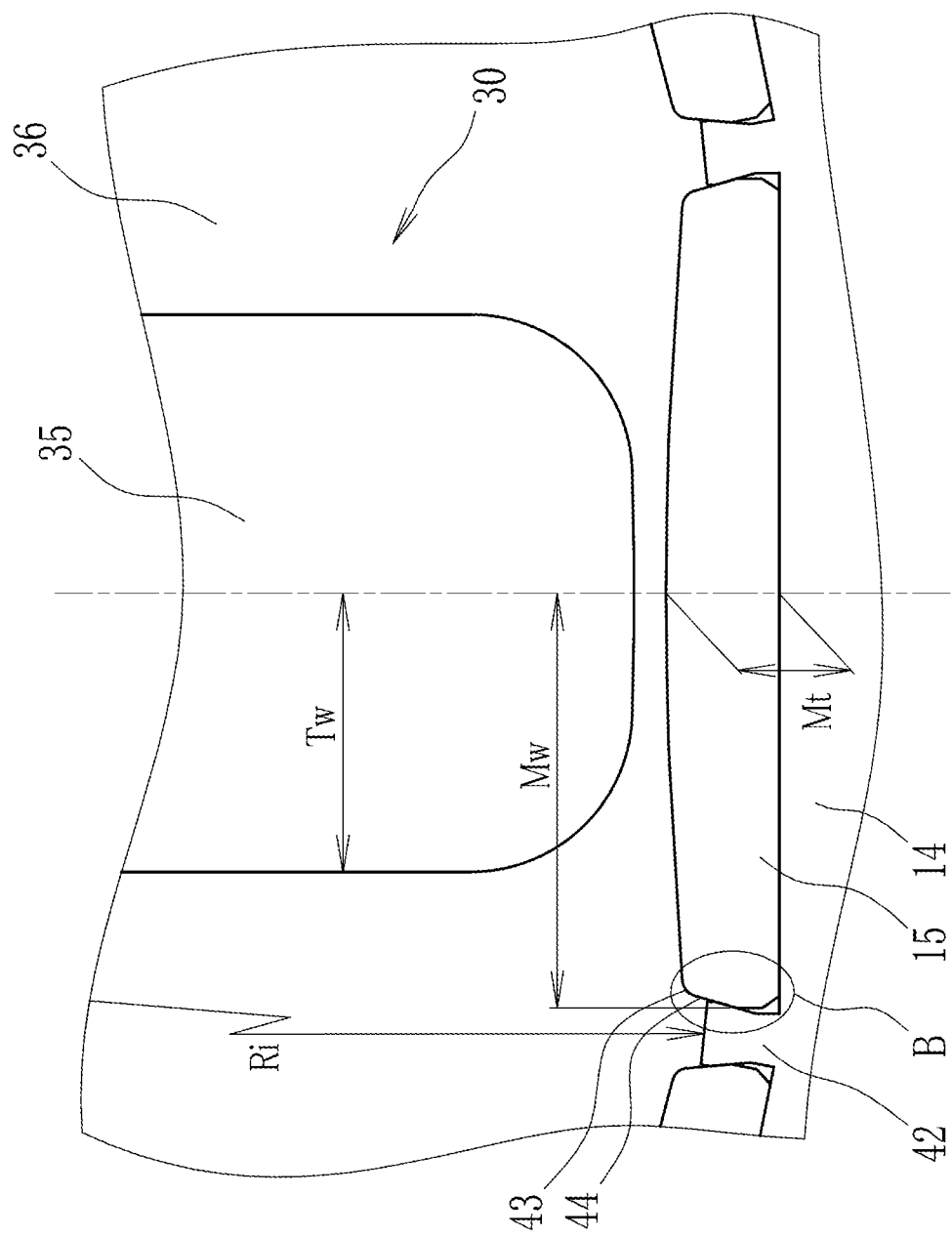
[FIG. 6]

[FIG. 7]
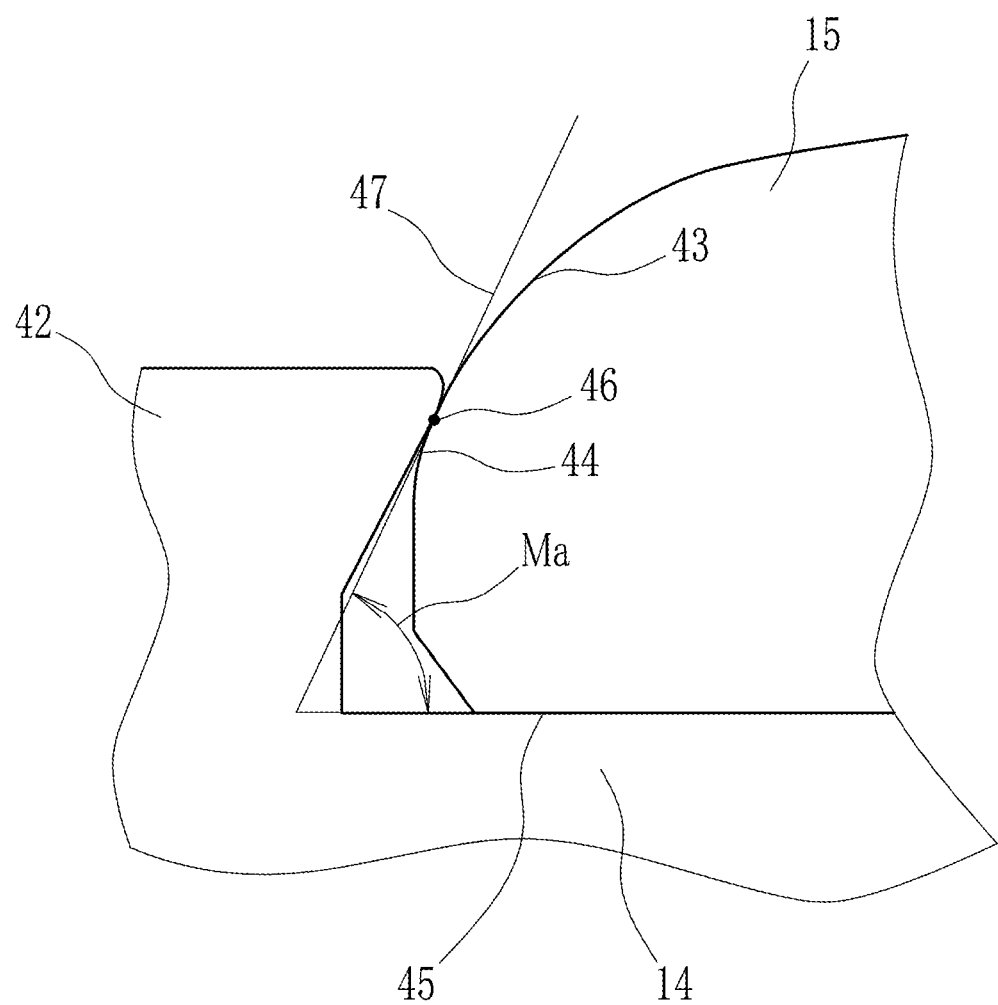

[FIG. 8]
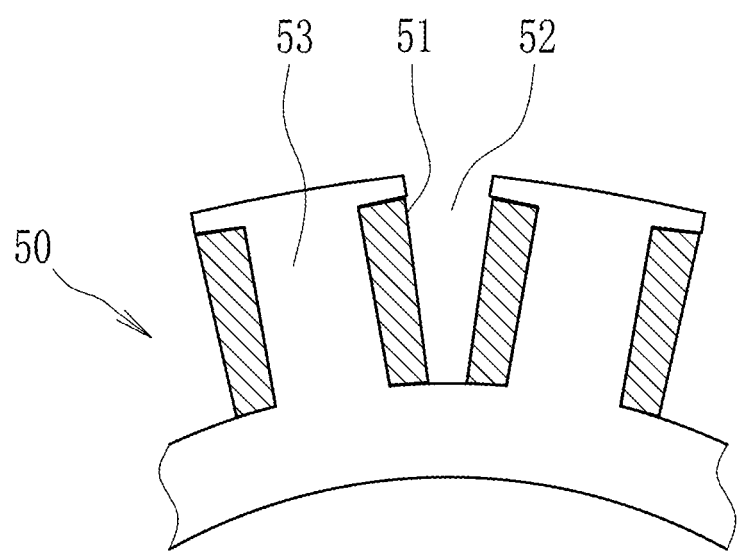

[FIG. 9]
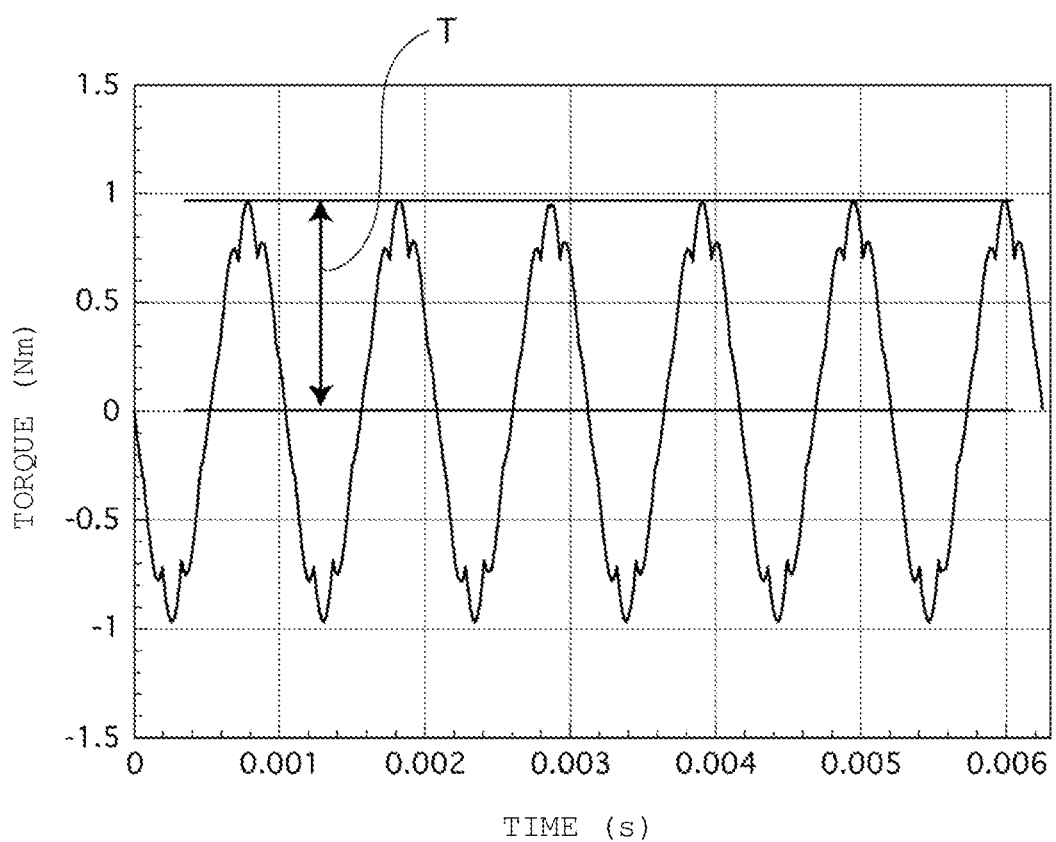

[FIG. 10]
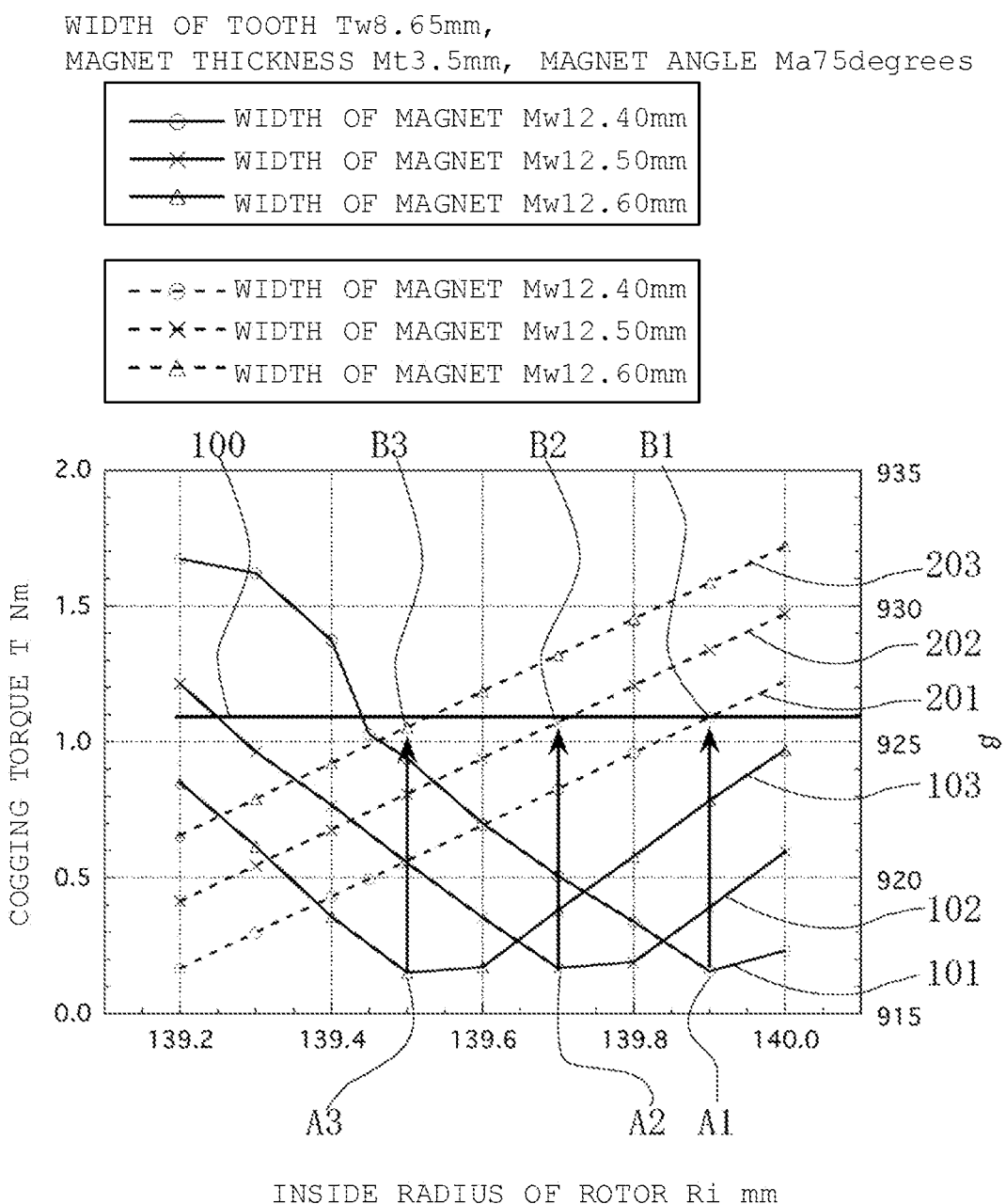

[FIG. 11]
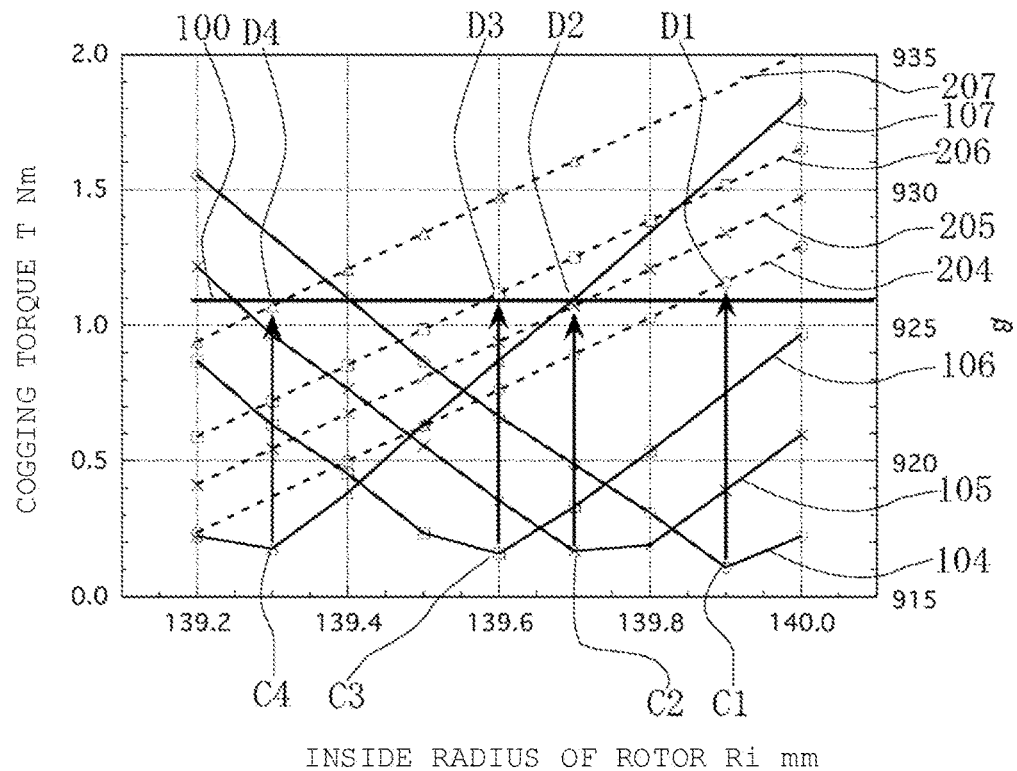

[FIG. 12]
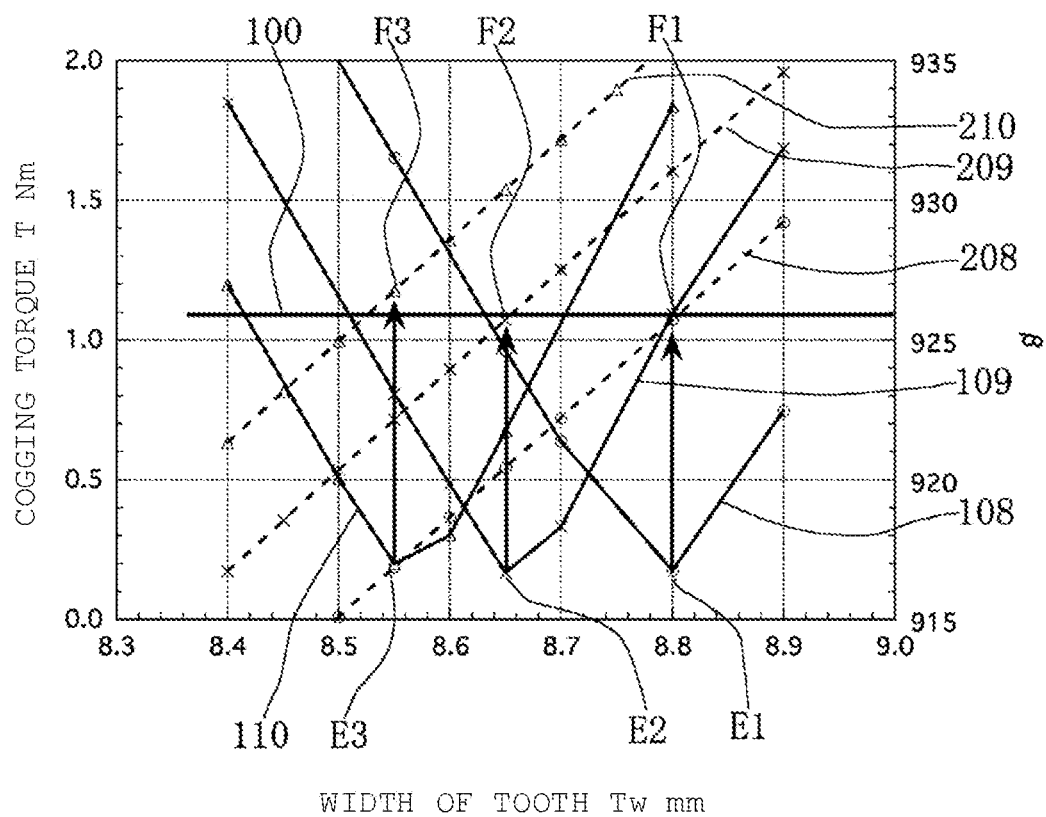

[FIG. 13]
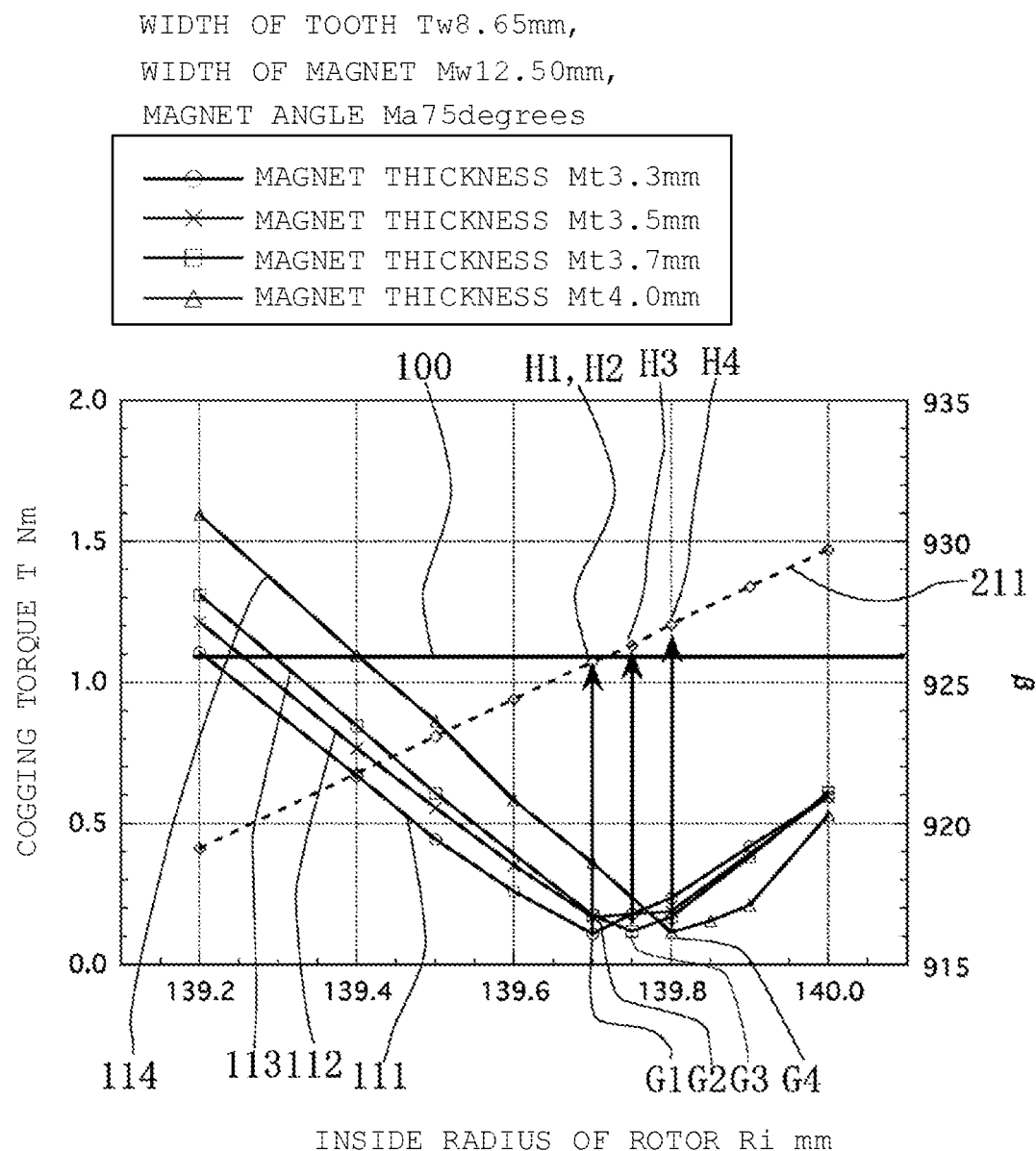

[FIG. 14]
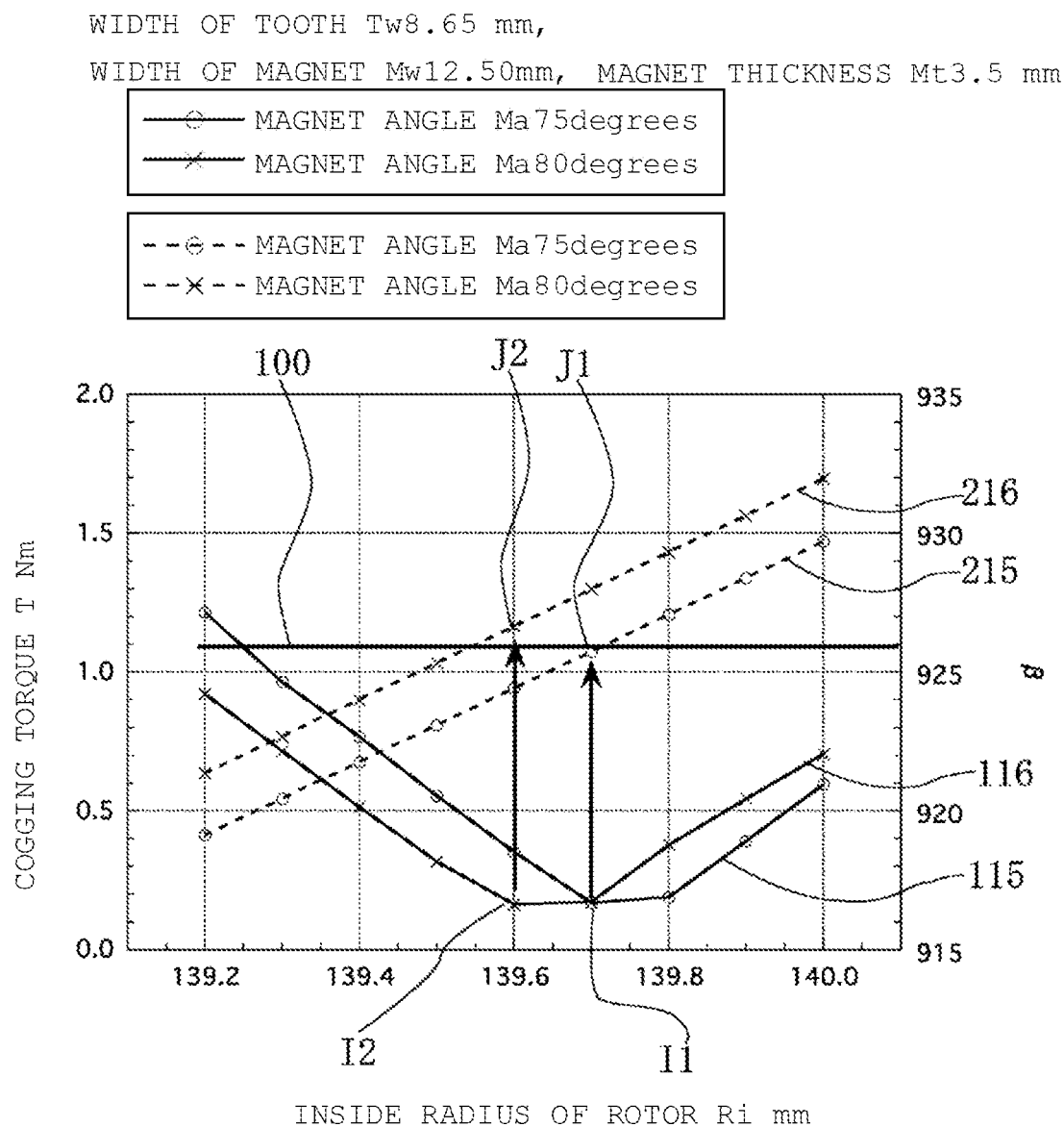

IN-WHEEL MOTOR

TECHNICAL FIELD

The present disclosure relates to an in-wheel motor of an outer-rotor type for driving a wheel of an in-wheel motor vehicle in which the electric motor is incorporated in the wheel.

BACKGROUND

Electric vehicles, which have been greatly developed recently, are driven by electric motors to be much quieter than those driven by gasoline engines. In particular, when the electric vehicle comes to a stop, it is very quiet, compared with the gasoline-engine vehicle, because the former's engine does not idle. However, the electric motor rotates with magnets disposed in a rotor and teeth with windings of a stator attracting and repelling each other alternately, which also causes torque pulses.

The torque pulses cause vibration which in turn makes sound, and thus are an adverse factor to the quietness of the electric vehicle. For the electric motor on no-load condition, without electric current applied, the pulsing torque is referred to as cogging torque, and the cogging torque is a value peculiar to an individual motor that is determined according to the shape of the stator, the number and shapes of the magnets in the stator, and the number and shapes of the teeth in the stator. In other words, once the specifications for a motor are set, its cogging torque cannot be reduced. Reducing the cogging torque has, therefore, been a problem in the design and analysis of the magnetic fields in the motor.

Generally, when the larger torque of a motor is needed, such a motor is likely to involve the larger cogging torque, and thus, it is not easy to achieve a large torque with a small cogging torque of a motor. Still, it is essentially important to reduce the cogging torque for an in-wheel motor in a direct drive system that needs a large torque, because, if the cogging torque of the in-wheel motor is large, the vibration due to the torque pulses is directly transmitted to the wheel.

Patent Literature 1 listed below proposes a motor with fractional slots in which each of the widths of the circumferentially arranged teeth of a stator or a rotor is one half of the slot pitch, which can achieve almost zero cogging torque.

Citation List

Patent Literature

Patent Literature 1: Japanese Patent Application Laid-open No. 2013-176202

SUMMARY

Technical Problem

In an example in Patent Literature 1, a motor has 20 magnetic poles with 24 slots (teeth), and therefore, the least common multiple (LCM) of the numbers of the poles and slots is 120, and the greatest common divisor (GCD) is 4. The larger the LCM is, the smaller the cogging torque is, which results in the smaller vibration; and the larger the GCD is, the more winding circuits in parallel the motor has, which in turn makes the current in the windings smaller, and thus, inhibits excessive heat from being generated. The configuration of the example in Patent Literature 1 achieves a larger LCM, and thus, a smaller cogging torque, but produces a smaller GCD, which in turn makes the current in the windings higher and is disadvantageous to the inhibition of excessive heat to be generated. It is possible to make the thickness of wire for the windings greater to inhibit excessive heat from being generated in this configuration; however, in that case, it becomes more difficult to form windings.

The present disclosure is intended to solve the above-mentioned problem in the conventional art, and provide an in-wheel motor of an outer-rotor type for driving a wheel of an in-wheel motor vehicle that is advantageous in reducing the cogging torque without producing disadvantages in the manufacture and practical applications.

Solution to Problem

To achieve the above-discussed objective, the present disclosure presents an in-wheel motor of an outer-rotor type for driving a wheel of an in-wheel motor vehicle having the motor incorporated in the wheel, the motor including a rotor of a surface permanent type, wherein a plurality of permanent magnets are fixed along an inner circumferential surface of the rotor, wedge-shaped protrusions for fixing the permanent magnets on the rotor, and a stator disposed inside the rotor, wherein teeth and slots are alternately formed on an outer circumferential portion of the stator, wherein the number of the aforementioned permanent magnets is 32 and the number of the aforementioned slots is 24, wherein each of the permanent magnets has chamfers on each of the ends so that a magnetic flux cannot concentrate, and is convex toward the stator, in a cross-section perpendicular to a rotary axis of the rotor.

The abovementioned fractional-slot configuration in the present disclosure having a ratio of the number of permanent magnets to that of the slots as 32 to 24 makes it possible to reduce the cogging torque and also avoid excessive heat to be generated in the windings without making it difficult to form the windings; moreover, helps achieve a low frequency inverter so that the motor can be easily controlled; provides a sufficient space in the slot not to cause disadvantages in the manufacture of coils and in terms of heat generation in operation; and thus, the abovementioned configuration is advantageous in reducing the cogging torque, without causing disadvantages in the manufacture and practical applications, and is suitable for applications to an in-wheel motor of an outer-rotor type for driving a wheel of an in-wheel motor vehicle.

It is preferable that an in-wheel motor according to the present disclosure satisfy the following Expression 1:

$$920 \leq \sqrt[3]{Mw} \times \sqrt[3]{Tw} \times Ri^2 \times \sqrt[8]{SinMa} \times \frac{1}{100} \leq 932 \quad \text{[Expression 1]}$$

where, Mw is a half width of each of the permanent magnets in millimeters; Tw is a half width of each of the teeth in millimeters; Ri is an inside radius of the rotor in millimeters; and Ma is an angle between a tangential line on the permanent magnet at a point of contact between the wedge-shaped protrusion and the permanent magnet, and a bottom on the rotor side of the permanent magnet, in a cross-sectional shape of the permanent magnet along a direction perpendicular to the rotary axis of the rotor.

A preferable configuration of the present disclosure in which Mw, Tw, Ri and Ma are so set as to satisfy Expression 1 can obtain an in-wheel motor of an outer-rotor type having cogging torques under a predetermined standard value.

It is preferable in an in-wheel motor according to the present disclosure that the wedge-shaped protrusions be formed integrally with the rotor. This feature can eliminate errors resulting from assembling the former with the latter, to ensure high accuracies of the inside radius of the rotor, Ri, and the angle, Ma, of the magnet. In addition, it makes it possible to align the permanent magnets with the wedge-shaped protrusions at a high accuracy, so that errors resulting from assembling the former with the latter are reduced, which is helpful in achieving the satisfaction with Expression 1 in an actual product.

It is preferable in the present disclosure that each of the permanent magnets engage with the wedge-shaped protrusion on an end side thereof from a position of the chamfer. This feature is advantageous in reducing short circuit that may occur through wedge-shaped protrusions between adjacent permanent magnets, because the wedge-shaped protrusion does not stick out toward the stator. The torque of the motor is a turning force produced by the stator and the permanent magnets attracting and repelling each other due to magnetic forces acting between them, and therefore, reducing short circuit with this feature is advantageous in inhibiting drops in the torque.

Advantageous Effects of Invention

The fractional-slot configuration of the ratio of the number of permanent magnets to the number of slots as 32 to 24, included in the present disclosure, can achieve an in-wheel motor of an outer-rotor type for driving an in-wheel motor vehicle with a reduced cogging torque without producing disadvantages in the manufacture or practical applications.

BRIEF DESCRIPTION OF THE DRAWINGS

FIG. 1 is an appearance view showing parts surrounding an in-wheel motor in an embodiment of the present disclosure;

FIG. 2 is a cross-sectional view showing the inside structure of the in-wheel motor of FIG. 1;

FIG. 3 is an enlarged view of a portion of an outer circumferential surface of a cover and other parts in the vicinity, shown in FIG. 2;

FIG. 4 is an exploded perspective view of an in-wheel motor in the embodiment of the present disclosure;

FIG. 5 is a plan view of a key portion of a motor structure of an in-wheel motor in the embodiment of the present disclosure;

FIG. 6 is an enlarged view of the portion indicated by "A" in FIG. 5;

FIG. 7 is an enlarged view of the portion indicated by "B" in FIG. 6;

FIG. 8 is an enlarged view of a portion of a stator illustrating a space in a slot;

FIG. 9 is a graph of cogging torque;

FIG. 10 is a graph showing change in the cogging torque T and β as the inside radius, Ri, of a rotor varies, for each of predetermined widths, Mw, of each magnet;

FIG. 11 is a graph showing change in cogging torque T and β as the inside radius, Ri, of the rotor varies, for each of predetermined widths, Tw, of each tooth of the stator;

FIG. 12 is a graph showing change in cogging torque T and β as the width, Tw, of each tooth of the stator varies, for each of predetermined values of the inside radius, Ri, of a rotor;

FIG. 13 is a graph showing change in cogging torque T and β as the inside radius, Ri, of the rotor varies, for each of predetermined values of the thickness, Mt, of each magnet; and FIG. 14 is a graph showing change in cogging torque T and β as the inside radius, Ri, of the rotor varies, for each of predetermined values of the angle, Ma, made on each magnet.

DETAILED DESCRIPTION OF THE EMBODIMENTS

Here, referring to the drawings, an embodiment of the present disclosure will be described. The embodiment relates to an in-wheel motor of an outer-rotor type for driving an in-wheel motor vehicle in which the motor is incorporated in a wheel of the vehicle. The in-wheel motor vehicle may be, but is not limited to, an electric vehicle, and may be a vehicle in which a gasoline engine generates electric power to drive a motor, as well. FIG. 1 is an appearance view showing parts surrounding an in-wheel motor in the embodiment of the present disclosure. For convenience of illustration, a wheel 2 is shown as a cross-sectional view, and a tire mounted on the wheel 2 is omitted in the figure. An in-wheel motor 1 is contained inside the wheel 2 of an electric vehicle, and, thus FIG. 1 shows a part of one of the wheels of the vehicle.

In FIG. 1, the in-wheel motor 1 is mounted on a suspension 3. A shock absorber 6 is secured between a pair of upper arms 4 and a lower arm 5 that constitutes the suspension 3, and a coil spring 7 is mounted to surround the shock absorber 6.

The in-wheel motor 1 includes a motor case 10. The motor case contains a motor structure. Referring to FIGS. 2 and 3, here, the motor structure will be described. FIG. 2 is a cross-sectional view showing the inside structure of the in-wheel motor of FIG. 1. For convenience of illustration, the figure shows the inside structure as partially simplified. FIG. 3 is an enlarged view of a portion of an outer circumferential surface of a case 10 and other parts in the vicinity, shown in FIG. 2. FIG. 4 is an exploded perspective view of an in-wheel motor 1. Referring to FIGS. 2-4, the inside structure of the in-wheel motor 1 will be described, here.

FIG. 2 shows the wheel as installed in the in-wheel motor 1, after the case 10 is fixed on a hub unit 11. In FIG. 2, a bolt 12 penetrates through a flange of the hub unit 11, the case 10, and the wheel 2; and is tightened with a nut (not shown). In that way, the wheel 2 is fixed to the in-wheel motor 1 to be integral with each other.

In FIG. 4, grooves 13 are formed on the inside circumferential surface of the case 10, and ridges 16 are formed on a rotor 14 in an annular shape. Permanent magnets 15 are fixed on the inside circumferential surface of the rotor 14. The rotor 14 is contained in the case 10 with the ridges 16 engaging with the grooves 13 of the case 10. In this arrangement, as illustrated in FIG. 3, a rotor clamp 20 and a dust seal 21 are fixed on the case 10 with a screw 22, and the rotor 14, sandwiched between spacers 18 and 19, is fixed on the inside circumferential surface of the case 10.

A brake shaft 24 is inserted through a through hole 23 in the hub unit 11 shown in FIG. 4. In an arrangement shown in FIG. 2, the brake shaft 24 is fixed on the hub unit 11, and a brake disk 26 (see FIG. 2) is fixed on the brake shaft 24 with a bolt 25 and a nut (not shown). In this arrangement, the hub unit 11, the case 10, the rotor 14, the brake shaft 24, and the brake disk 26 are integrated into one integrated structure, and the wheel 2 is fixed on this structure.

The in-wheel motor 1 in this embodiment is of an outer-rotor type; in other words, the rotor 14 as an outer rotor rotates. In the above-mentioned integrated structure, the case 10, an inside diameter side part of a bearing (not shown) in the hub unit 11, the brake shaft 24, and the brake disk 26 rotate, all integrated with the rotor 14, at the same rate as that of the rotor 14; and the wheel 2, integrated with those parts, also rotates.

In FIG. 4, a coil 31 is wound around a stator (an iron core) 30. The wire of the coil 31 is connected to an outer circumferential portion of a bus bar ring 37. A motor support 32 and a motor base 33, shown in FIG. 4, constitute a support body 34. In the arrangement shown in FIG. 2, outer circumferential surfaces of the motor support 32 and the motor base 33 are fit with an inner circumferential surface of the stator 30, and the stator 30 is fixed on the support body 34, which is constituted of the motor support 32 and the motor base 33. As illustrated in FIG. 4, a bolt 40 is integrated with the motor base 33, and the bolt 40 penetrates through a seal plate 41. In the arrangement shown in FIG. 2, the bolt (not shown in FIG. 2) is inserted through a knuckle 8, and tightened with a nut (not shown). Thus, the stator 30 is secured to the knuckle 8 with the support body 34 intervening therebetween.

Accordingly, the stator 30, the support body 34 and a seal plate 41, both integrated with the stator, are stationary and do not rotate. In the arrangement shown in FIG. 2, the support body 34 and the seal plate 41 are fixed to the hub unit 11. As described above, the hub unit 11 rotates integrally with the wheel 2. However, the hub unit 11 contains a bearing (not shown) which allows the parts of the unit 11 to which the support body 34 and the seal plate 41 are mounted to be stationary while the part to which the wheel 2 is mounted is rotating. In FIG. 3, there is a gap T formed between the rotor 14 integrated with a permanent magnet 15 and the stator 30 on which the coil 31 is wound. When the coil 31 is electrified, the rotor 14 integrated with the permanent magnet 15 rotates.

Here, the motor structure of the in-wheel motor 1 will be described. FIG. 5 is a plan view of a key portion of the motor structure of the in-wheel motor 1 in the embodiment. FIG. 6 is an enlarged view of the portion indicated by "A" in FIG. 5, and FIG. 7 is an enlarged view of the portion indicated by "B" in FIG. 6. In FIG. 5, the rotor 14 is of a surface permanent magnetic type, wherein a plurality of permanent magnets 15 are fixed along an inner circumferential surface of the rotor 14. More specifically, as illustrated in FIGS. 6 and 7, each permanent magnet 15 is fixed on the rotor 14 via a wedge-shaped protrusion 42 integral with the rotor 14. In FIG. 5, the stator 30 is disposed inside the rotor 14, and teeth 35 and slots 36 are alternately formed on an outer circumferential surface of the stator 30.

FIG. 6 shows a cross-sectional view of the permanent magnet 15 on a cutting plane perpendicular to the rotary axis of the rotor 14. The permanent magnet 15 is convex on the stator 30 side, and has a chamfer 43 on each end so that the magnetic flux cannot concentrate. As illustrated in FIG. 7, the permanent magnet 15 engages with the wedge-shaped protrusion 42 at an engagement portion 44 of the magnet 15 nearer to the end thereof than the chamfer 43 is. The engagement portion 44 may have a straight-line contour or a curved contour. The wedge-shaped protrusion 42 contacts with the engagement portion 44 at a contact point 46, and a tangential line 47 is tangential at the contact point 46.

The configuration of the in-wheel motor 1 has been outlined above; and for such an in-wheel motor of an outer-rotor type as applied to an electric vehicle, etc., (hereinafter referred to as "EV, etc.") to drive its wheels, it is necessary to reduce the cogging torque, because the motor is contained in a wheel, and thus, it is difficult to incorporate an anti-vibration configuration, and because vibrations caused by the torque pulses of the motor are directly transmitted to the vehicle body in the case of a direct drive system. The inventor of the present application has focused on the number of permanent magnets and the number of slots in such a motor to reduce the cogging torque.

Although a combination of a number of permanent magnets and a number of slots is sometimes referred to as a "slot combination", it is referred to as a "configuration" for the purpose of this description of the embodiment. For example, a combination of 32 permanent magnets 15 and 24 slots 36 is referred to a configuration of the number of permanent magnets to the number of slots as 32 to 24. When such a configuration is represented not by specific numbers of the magnets and slots but a ratio as a relative relationship between the numbers thereof, it will be explicitly stated that the expression of the configuration is a ratio.

The configuration of the number of permanent magnets to the number of slots in a ratio of 2 to 3 is referred to as integer slots, but any such configuration expressed by a different ratio is referred to as fractional slots. The cogging torque tends to be smaller as the least common multiple (LCM) of the number of permanent magnets and the number of slots is larger. For example, for the configuration of the number of permanent magnets to the number of slots as 16 to 24, the LCM of those numbers is 48, and, for the configuration of such numbers as 20 to 24, the LCM of those numbers is 120; then, the fractional-slot configuration has a smaller cogging torque than the integer-slot configuration.

However, the fractional-slot configuration is disadvantageous in that the windings are not wound in the same direction, and are complicated, and that it does not allow for a large number of parallel winding circuits. The value of current in each coil is determined by dividing the total current in the motor by the number of the parallel circuits, and therefore, if the number of parallel circuits cannot be large, the current in each coil must be higher, which results in a greater heat generated due to the resistance. To inhibit excessive heat from being generated, coil wire of a larger diameter may be used to make the cross-sectional area of the wire larger, or two or three wires of a small diameter are wound together; however, in either case, there are difficulties involved in forming windings.

The maximum number of parallel circuits is determined according to the greatest common divisor (GCD) of the number of permanent magnets and the number of slots; and the greater the GCD is, the more of parallel circuits are allowed. For the configuration of the number of permanent magnets to the number of slots as 16 to 24, the greatest common divisor is 8; for the configuration of those numbers as 20 to 24, the greatest common divisor is 4; and thus, the latter configuration is advantageous over the former in reducing the cogging torque; but disadvantageous in inhibiting excessive heat from being generated without inflicting difficulties in forming the wirings. In other words, neither of the configurations can reduce the cogging torque while inhibiting excessive heat from being generated without inflicting difficulties in the forming of wirings.

The inventor of the present application has found that a configuration of the number of permanent magnets to the number of slots in a ratio of 4 to 3 satisfies both a requirement of having a large LCM of those numbers and a requirement of having a large GCD thereof, and therefore, that the configuration may make it possible to reduce the cogging torque and also inhibit excessive heat from being generated while increasing the number of parallel circuits, in other words, to inhibit excessive heat from being generated without inflicting difficulties in forming the wirings. With the abovementioned finding, the inventor has considered a suitable number of permanent magnets and a suitable number of slots in an in-wheel motor of an outer-rotor type for driving a wheel of an EV, etc.

It is known that increasing the number of permanent magnets to have more magnetic poles in the motor, so that the pole pitch is smaller, resulting in a smaller cogging torque. However, the output frequency f (Hz) of the inverter is determined by the following Equation (1):

$$f=(N/60)\times(P/2),\qquad\text{Equation (1)}$$

where N is the rotation per minute (rpm) of the motor and P is the number of permanent magnets. Equation (1) indicates that the more permanent magnets are provided, the higher the output frequency of the inverter is, which in turn makes it difficult to control the motor, and therefore, it is not desirable to increase the number of poles. The configuration of 8 poles and 48 slots is adopted for the on-board motors of many of the electric vehicles and hybrid vehicles in mass production, and in that case, the reduction ratio is, for example, 8.1938. Assuming, then, that the diameter of the wheel is 16 inches, and the outer diameter of the tire is 600 mm (on the assumption that the tire of 205/55R16 of a diameter of 632 mm is compressed by 5% due to the weight of the vehicle), the rotation rate of the motor is 8700 rpm, with the vehicle travelling at a rate of 120 km/h, and the output frequency of the inverter is 580 Hz, which is high.

In the case of an in-wheel motor of a direct drive system, such as an in-wheel motor of an outer-rotor type, the gear ratio is 1, and thus, assuming that the diameter of the wheel is 16 inches, and the outer diameter of the tire is 600 mm, the same as the above, and the vehicle travels at 120 km/h, the same as the above, the rotation rate of the motor is much lower than 8700 rpm, and the output frequency of the inverter is accordingly lower, so that the motor is readily controlled unlike the case of the on-board motors. In other words, the in-wheel motor of a direct drive system, such as an in-wheel motor of an outer-rotor type, allows for a larger number permanent magnets incorporated than the on-board motor does.

Another consideration in the design of such a motor is a slot space. The slot space is the area in the slot excluding the windings. FIG. 8 shows an enlarged view of a portion of a stator 50. A coil 51 is wound on a tooth 53 of the stator 50, and a space between the adjacent coils 51 is a slot space 52. The occupation ratio is a proportion of the area occupied by the coil 51 in the slot to the area of the slot.

In FIG. 8, increasing the number of windings of the coil 51 makes an output torque higher, or increasing the diameter of wire of the coil 51 inhibits excessive heat from being generated in the coil 51 when electrified; and in that sense, it is more desirable that the occupation ratio be higher. However, making the occupation ratio higher means that the area of the coil 51 is increased as the slot space 52 is decreased.

In the manufacture of the coil 51, a winding machine is used to deliver out wire through a tip of a needle provided in the machine, and wind it to be the coil 51 around the tooth 53 of the stator 50. If the slot space 52 is narrow, it is more likely that the windings in the slot interfere with the needle, so that it may be difficult to put the needle into the slot; or, in the case that wire windings already made in the form of the coil 51 are to be fit over the tooth 53, it may be difficult to put them into the slot. In addition, with the slot space 52 being narrow, heat generated in one coil 51 when electrified adversely affects another coil 51.

Accordingly, if the slot space 52 is narrow, it is disadvantageous to the manufacture of the coil 51 (especially, to the automatic coil winding), and causes heat generated in one coil 51 to adversely affect another coil 51, and thus, it is desirable that the slot space 52 be broad. In this respect, if the size of the motor, the ratio of the tooth to the slot (pitch), and the occupation ratio each are the same, the size of the slot space 52 is in inverse proportion to the number of slots, i.e., the former is smaller as the latter is larger. Therefore, if the number of slots is made large, the size of the slot space 52 may become too small, and thus, it is desirable to choose a suitable number of slots that is not too large.

In view of the considerations discussed above, the inventor of the present application has found that a fractional-slot configuration of the number of permanent magnets to the number of slots in a ratio of 4 to 3 can achieve the reduction of the cogging torque, and also, the inhibition of excessive heat generation in the coils without inflicting difficulties in the forming of coil windings, and moreover, has noticed that an in-wheel motor of a direct drive system, such as an in-wheel motor of an outer-rotor type, may be able to include more permanent magnets in it than an on-board motor. The inventor has then studied a fractional-slot configuration of the number of permanent magnets to the number of slots in a ratio of 4 to 3 by gradually increasing the number of permanent magnets to find such a configuration suitable for an in-wheel motor. Next, referring to Table 1, the study will be described specifically.

The following Table 1 contains five different configurations with different combinations of numbers of permanent magnets and numbers of slots, with the respective least common multiples (LCM), the respective greatest common divisors (GCD), the respective output frequencies of the inverter, and the respective slot space. The slot spaces are expressed by the respective ratios to the slot space size of No. 1 that is set at 1. The output frequencies of the inverter are calculated on the condition that the wheel diameter is 15 inches, the outer diameter of the tire is 545 mm (on the assumption that the tire of 175/55R15 with an outer diameter of 574 mm is compressed by 5% due to the vehicle weight), and the vehicle travels at 120 km/h.

TABLE 1

| No. | Number of magnets to number of slots | Ratio | Least Common Multiple | Greatest Common Divisor | frequency of inverter | Slot space (ratio) |
|---|---|---|---|---|---|---|
| 1 | 16:24 | 2:3 | 48 | 8 | 156 | 1 |
| 2 | 20:24 | 5:6 | 120 | 4 | 195 | 1 |
| 3 | 28:21 | 4:3 | 84 | 7 | 273 | 1.14 |
| 4 | 32:24 | 4:3 | 96 | 8 | 312 | 1 |
| 5 | 36:27 | 4:3 | 108 | 9 | 351 | 0.89 |

According to Table 1, No. 1 yields the smallest LCM, and thus, is not advantageous in reducing the cogging torque; and No. 2 yields the smallest GCD, and thus, is not advantageous in inhibiting excessive heat generation without inflicting difficulties in the forming of coil windings. Nos. 3-5 each are configurations of numbers of permanent magnets to numbers of slots in a ratio of 4 to 3, respectively yielding large LCMs and GCDs; and thus, can achieve the reduction of the cogging torque, and also, the inhibition of excessive heat generation in the coils without inflicting difficulties in the forming of coil windings. In addition, Nos. 3-5 respectively yield sufficiently small output frequencies of the inverter.

More specifically, Nos. 3-5 have numbers of permanent magnets in the increasing order, and, the more permanent magnets a configuration has, the larger LCM and GCD it yields. Therefore, No. 5 is the best in achieving both the reduction of the cogging torque, and the inhibition of excessive heat generation without inflicting difficulties in the forming of coil windings.

However, No. 5 involves a slot space value less than 1 because it has the largest number of slots, and thus, is disadvantageous in the manufacture of coils and an adverse effect of heat generation of one coil on another. No. 4 has a smaller number of slots than No. 5, resulting in a slot space value of 1, and thus, is not disadvantageous as in No. 5. In other words, it can be appreciated that No. 4 is advantageous in reducing the cogging torque without having the disadvantages in the manufacture or practical applications.

In view of the above-discussed considerations, the fractional-slot configuration of the number of permanent magnets to the number of slots as 32 to 24 is found to achieve both the reduction of the cogging torque and the inhibition of excessive heat generation without inflicting difficulties in the forming of coil windings; it involves a relatively low output frequency of the inverter, so that the motor can be easy to control; furthermore, it secures a sufficient size of the slot space, so that it is not disadvantageous in terms of the manufacture of coils or a possible adverse effect of heat generation of one coil on another. In other words, the inventor of the present application has found that the fractional-slot configuration of the number of permanent magnets to the number of slots as 32 to 24 is advantageous in reducing the cogging torque without inflicting disadvantages in the manufacture and practical applications, and that it is suitable for an in-wheel motor of an outer-rotor type for driving a wheel of an in-wheel motor vehicle.

The inventor of the present application has further studied more fundamentally the principles of a motor in terms of the reduction of the cogging torque. In this respect, referring to FIG. 5, torque pulses are produced by the rotor 14 and the stator 30 attracting and repelling each other, and this is phenomena that are caused by magnetic forces acting between them. To reduce the cogging torque, how the magnetic forces are made to vary smoothly, and how magnetic paths through which the magnetic forces act are formed, are two key questions.

With regard to magnetic forces acting between the rotor and the stator, the magnetic path can only pass through the tooth width portion of the tooth 35 on which a coil (not shown in FIG. 5) is wound on the stator 30 side in FIG. 5, and that portion is a facing portion itself acting with the rotor 14. The permanent magnet 15 is a source of magnetism on the rotor 14 side to create magnet forces acting on the stator. Specifically, the magnet width of the permanent magnet 15, and the shape of the portion of the stator 30 facing the permanent magnet, are key factor on which whether the magnetic forces vary smoothly depends finally. In addition, the angle of inclination of each end portion of each permanent magnet 15 affects change in magnet force between adjacent permanent magnets 15 having opposite magnet poles to each other.

Furthermore, when a permanent magnet 15 is fixed with wedge-shaped protrusions 42 which are integral with a rotor 14, as in FIG. 6, each wedge-shaped protrusion 42 makes a magnetic path determining the degree of short circuit between adjacent permanent magnets 15 that have opposite poles to each other. With regard to magnetic forces acting between the stator 30 and the rotor 14, a wedge-shaped protrusion 42 also functions as a bridge between adjacent permanent magnets 15 in terms of the magnetic forces in smooth transition therebetween. The crest of a wedge-shaped protrusion 42 is a start point of the inside diameter of the rotor 14, and thus, the height of the wedge-shaped protrusion 42 is directly related to the inside diameter of the rotor 14.

In view of the foregoing, the inventor of the present application inferred that the tooth width, the magnet width, the inside diameter of the rotor, and the angle of inclination of each end of each magnet in a motor structure are related to the cogging torque to be reduced, in all likelihood, and carried out an enormous amount of analytical research based on the aforementioned inference; and found that not only configurations of the abovementioned embodiment, but also certain conditions, when satisfied, achieve the reduction of the cogging torque to a predetermined standard value or lower. Specifically, in FIG. 6, satisfying the following Expression 2 can reduce the cogging torque to a predetermined standard value (1.5 Nm in this embodiment) or lower:

$$920 \leq \sqrt[3]{Mw} \times \sqrt[3]{Tw} \times Ri^2 \times \sqrt[8]{SinMa} \times \frac{1}{100} \leq 932 \quad \text{[Expression 2]}$$

where, in FIG. 6, Nw (mm) is the half width of the permanent magnet 15 (magnet width); Tw (mm) is the half width of the tooth 35 (tooth width); Ri (mm) is the inside diameter of the rotor 14 (radius); and, in FIG. 7, Ma (degree) is the angle made by a tangential line 47 on the permanent magnet 15 at a contact point 46 of the wedge-shaped protrusion 42 and the permanent magnet 15, and the bottom on the rotor 14 side of the permanent magnet 15.

For convenience of description, the middle part of Expression 2 is represented by β, as shown in the following Expression 3.

$$\beta = \sqrt[3]{Mw} \times \sqrt[3]{Tw} \times Ri^2 \times \sqrt[8]{SinMa} \times \frac{1}{100} \quad \text{[Expression 3]}$$

FIG. 9 is a graph of cogging torque. As shown in the graph, the cogging torque is represented by periodically varying waves, with the amplitude T being the cogging torque value. For example, a cogging torque of 1.5 Nm indicates a value of 1.5 Nm of amplitude T.

FIG. 10 is a graph showing change in the cogging torque, T (Nm), and β (Expression 3) value according to varied inside radii, Ri (mm), of the rotor, with a tooth half width, Tw, of 8.65 mm, a magnet thickness, Mt, of 3.5 mm, and a magnet angle, Ma, of 75 degrees, for each of different magnet half widths, Mw: 12.40 mm, 12.50 mm, and 12.60 mm. The motor analyzed to produce the graph in FIG. 10 was configured as illustrated in FIG. 5-7, having a fractional-slot configuration with the number of permanent magnets to the number of slot as 32 to 24. The same configuration was used in analyses resulting in FIGS. 11-14.

Line 101 indicates change in the cogging torque, T (Nm), according to varied inside radii, Ri (mm), of the rotor, with a magnet half width, Mw, of 12.40 mm, and line 201 indicates change in β value according to the varied inside radii, Ri (mm), of the rotor with the same magnet half width, Mw, of 12.40 mm. Similarly, lines 102 and 202 indicate such changes in the cogging torque, T (Nm), and β value, respectively, with a magnet half width, Mw, of 12.50 mm; and lines 103 and 203 indicate such changes, with a magnetic half width, Mw, of 12.60 mm. Line 100 indicates a β value of 926 on Line 100 (the same for FIGS. 11-14).

Line 101 shows that the cogging torque, T, is lowest at point A1, which corresponds to a β value at point B1 on line 201. Similarly, line 102 shows that the cogging torque, T, is lowest at point A2, which corresponds to a β value at point B2 on line 202, and line 103 shows that the cogging torque, T, is lowest at point A3, which corresponds to a β value at point B3 on line 203. Points B1, B2 and B3 are on or near line 100, and thus, the values at those points are, or are close to, 926.

The values of the cogging torque, T, at points A1-A3 on lines 101-103 are the smallest on the respective lines and well below 1.5 Nm, and the corresponding β values are, or are close to, 926. On each of lines 101-103, in an Ri range of the Ri value corresponding to the smallest T value +/− a predetermined Ri width, the cogging torques T are, also, well below 1.5 Nm.

FIG. 11 shows changes in the cogging torque, T (Nm), and β value according to varied inside radii, Ri (mm), of the rotor, with a magnet thickness, Mt, of 3.5 mm, a magnet half width, Mw, of 12.50 mm, and a magnet angle, Ma, of 75 degrees, for each of different tooth half, Tw: 8.60 mm, 8.65 mm, 8.70 mm, and 8.80 mm.

Line 104 indicates change in the cogging torque, T (Nm), according to the varied inside radii, Ri (mm), of the rotor, with a tooth half width, Tw, of 8.60 mm, and line 204 indicates change in β value according to the varied inside radii, Ri (mm), of the rotor with the same magnet tooth half width, Tw, of 8.60 mm. Similarly, lines 105 and 205 indicate such changes in the cogging torque, T (Nm), and β value, respectively, with a tooth half width, Tw, of 8.65 mm; lines 106 and 206 indicate such changes in the cogging torque, T (Nm), and β value, respectively, with a tooth half width, Tw, of 8.70 mm; and lines 107 and 207 indicate such changes in the cogging torque, T (Nm), and β value, respectively, with a tooth half width, Tw, of 8.80 mm.

Line 104 shows that the cogging torque, T, is lowest at point C1, which corresponds to a β value at point D1 on line 204. Similarly, line 105 shows that the cogging torque is lowest at point C2, which corresponds to a β value at point D2 on line 205; line 106 shows that the cogging torque is lowest at point C3, which corresponds to a β value at point D3 on line 206; and line 107 shows that the cogging torque is lowest at point C4, which corresponds to a β value at point D4 on line 207. Points D1, D2, D3, and D4 are on or near line 100, and thus, the values at those points are, or are close to, 926.

The values of cogging torque, T, at point C1-C4 on lines 104-107, which are lowest on the respective lines are well below 1.5 Nm, and the β values for the respective configurations are, or are close to, 926. On each of lines 104-107, in an Ri range of the Ri value corresponding to the smallest T value +/− a predetermined Ri width, the cogging torques T are, also, well below 1.5 Nm.

FIG. 12 shows changes in the cogging torque, T (Nm), and β value according to varied tooth half width, Tw (mm), with a magnet half width, Mw, of 12.50 mm, a magnet thickness, Mt, of 3.5 mm, and a magnet angle, Ma, of 75 degrees, for each of inside radii, Ri (mm), of the rotor: 139.3 mm, 139.7 mm, and 140.05 mm.

Line 108 indicates change in the cogging torque, T (Nm), according to the varied tooth half width, Tw (mm), with an inside radius, Ri (mm), of the rotor of 139.3 mm, and line 208 indicates change in β value the varied tooth half width, Tw (mm), with the same inside radius, Ri (mm), of the rotor of 139.3 mm. Similarly, lines 109 and 209 indicate such changes in the cogging torque, T (Nm), and β value, respectively, with an inside radius, Ri (mm), of the rotor of 139.7 mm; and lines 110 and 210 indicate such changes in the cogging torque, T (Nm), and β value, respectively, with an inside radius, Ri (mm), of the rotor of 140.05 mm.

Line 108 shows that the cogging torque, T, is lowest at point E1, which corresponds to a β value at point F1 on line 208. Similarly, line 109 shows that the cogging torque is lowest at point E2, which corresponds to a β value at point F2 on line 209; line 110 shows that the cogging torque is lowest at point E3, which corresponds to a β value at point F3 on line 210; and the points F1, F2, and F3 are on or near line 100, and thus, the β values at those points are, or are close to, 926.

The values of cogging torque, T, at points E1-E3 on lines 108-110, which are lowest on the respective lines are well below 1.5 Nm, and the β values for the respective configurations are, or are close to, 926. On each of lines 108-110, in a Tw range of the Tw value corresponding to the smallest T value +/− a predetermined Tw width, the cogging torques T are, also, well below 1.5 Nm.

FIG. 13 shows changes in the cogging torque, T (Nm), and β value according to varied inside radii, Ri (mm), of the rotor, with a tooth half, Tw, of 8.65 mm, a magnet half width, Mw, of 12.50 mm, a magnet angle, Ma, of 75 degrees, for each of different magnet thickness, Mt, of: 3.3 mm, 3.5 mm, 3.7 mm, and 4.0 mm.

Line 111 indicates change in the cogging torque, T (Nm), according to the varied inside radii, Ri (mm), of the rotor, with a tooth thickness, Mt, of 3.3 mm; line 112 indicates change in the cogging torque, T (Nm), according to the varied inside radii, Ri (mm), of the rotor, with a tooth thickness, Mt, of 3.5 mm; line 113 indicates change in the cogging torque, T (Nm), according to the varied inside radii, Ri (mm), of the rotor, with a tooth thickness, Mt, of 3.7 mm; and line 114 indicates change in the cogging torque, T (Nm), according to the varied inside radii, Ri (mm), of the rotor, with a tooth thickness, Mt, of 4.0 mm.

The magnet thickness, Mt, is not included as a variable in Expression 2, and in FIG. 13, the tooth half width, Tw, the magnet half width, Mw, and the magnet angle, Ma, are fixed; and therefore, the β values corresponding lines 111-114 are represented by a single line 211.

Line 111 shows that the cogging torque, T, is lowest at point G1, which corresponds to a β value at point H1 on line 211. Similarly, line 112 shows that the cogging torque, T, is lowest at point G2, which corresponds to a β value at point H2 on line 211; line 113 shows that the cogging torque, T, is lowest at point G3, which corresponds to a β value at point H3 on line 211; line 114 shows that the cogging torque, T, is lowest at point G4, which corresponds to a β value at point H4 on line 211; and the points H1, H2, H3, and H4 are on, or near, line 100, and the values at those points are, or are close to, 926.

The values of cogging torque, T, at point G1-G4 on lines 111-114, which are lowest on the respective lines are well below 1.5 Nm, and the β values for the respective configurations are, or are close to, 926. On each of lines 111-114, in an Ri range of the Ri value corresponding to the lowest T value +/− a predetermined Ri width, the cogging torques T are, also, well below 1.5 Nm.

Lines 111-114 correspond to different magnet thicknesses, Mt, which is not included as a variable in Expression 2; and those lines in the figure show similar trends to one another as illustrated in FIG. 13, so it is comprehensible that the magnet thickness, Mt, is a factor that much less affects the cogging torque, T.

FIG. 14 shows changes in the cogging torque, T (Nm), and β value according to varied inside radii, Ri, (mm) of the rotor, with a tooth half width, Tw, of 8.65 mm, a magnet half width, Mw, of 12.50 mm, and a magnet thickness, Mt, of 3.5 mm, for each of different magnet angles, Ma: 75 degrees and 80 degrees.

Line 115 indicates change in the cogging torque, T (Nm), according to varied inside radii, Ri (mm), for a magnetic angle, Ma, of 75 degrees, and line 215 indicates change in β value according to the varied inside radii, Ri (mm), for the same magnetic angle, Ma, of 75 degrees. Similarly, lines 116 and 216 indicates such changes in the cogging torque, T (Nm), and β value for a magnetic angle, Ma, of 80 degrees.

Line 115 shows that the cogging torque, T, is lowest at point I1, which corresponds to a β value at point J1 on line 215. Similarly, line 116 shows that the cogging torque, T, is lowest at point I2, which corresponds to a β value at J2 on line 216. The points J1 and J2 are on, or near, line 100, and thus, the values on those points are, or are close to, 926.

The values of cogging torque, T, at points I1 and I2 on lines 115 and 116, which are lowest on the respective lines are well below 1.5 Nm, and the β values for the respective configurations are, or are close to, 926. On each of lines 115 and 116, in an Ri range of the Ri value corresponding to the lowest T value +/− a predetermined Ri width, the cogging torques T are, also, well below 1.5 Nm.

Referring to FIGS. 10-14, the analysis results are described above, and in the configurations having the smallest values of cogging torque, T, those values are well below 1.5 Nm, and the corresponding β values are, or are close to, 926. Accordingly, setting the values of Mw, Tw, Ri, and Ma in Expression 3 so that the resulted β value can be, or be close to, 926, can provide a configuration of an in-wheel motor of an outer-rotor type having a cogging torque, T, well below 1.5 Nm.

In addition, as described above, in each of FIGS. 10-14, in a range of the Ri or Tw value corresponding to the lowest, T, value +/− a predetermined Ri or Tw width, the cogging torque is still well below 1.5 Nm. According to results of analysis of FIGS. 10-14, when the β value is between 920 and 932, the cogging torque, T, is well below 1.5 Nm. Therefore, setting such values of Mw, Tw, Ri, and Ma as to satisfy Expression 2 can obtain a configuration of an in-wheel motor of an outer-rotor type having a cogging torque, T, well below 1.5 Nm.

Heretofore, configurations of an in-wheel motor of an outer-rotor type that satisfy conditions of the number of permanent magnets to the number of slots, and the mathematical expressions, are described, but hereinafter, more preferable such configurations will be described. As mentioned above, in FIG. 7, the permanent magnet 15 engages with the wedge-shaped protrusion 42 at the engagement portion 44 on its end side from the chamfer 43. This configuration can restrain the wedge-shaped protrusion 42 from sticking out toward the stator 30, and thus, is advantageous in reducing short circuit that may occur between adjacent permanent magnets 15 via a wedge-shaped protrusion 42. The torque of a motor is a turning force produced by the stator 30 and the permanent magnets 15 attracting and repelling each other due to magnetic forces acting between them, and therefore, reducing short circuit with this configuration is advantageous in inhibiting drops in the torque.

Furthermore, in FIGS. 6 and 7, the wedge-shaped protrusion 42 is formed not to be separate from the rotor 14, but to be integral with the rotor 14. More specifically, an electromagnetic steel sheet in which wedge-shaped protrusions 42 and a rotor 14 are formed integrally by pressworking is stacked to produce the rotor 14 integrated with the wedge-shaped protrusions 42. Thus, the manufacture of the rotor does not include a process of assembling a rotor 14 with wedge-shaped protrusions 42, and therefore, the product has no errors due to the assembling work. The wedge-shaped protrusion 42 is a structure that determines the inside radius, Ri, of the rotor (see FIG. 6) and the magnet angle, Ma, (see FIG. 7) in Expression 2. Without assembling errors in the wedge-shaped protrusions 42, high accuracies in the inside radius, Ri, of the rotor and the magnet angle, Ma, are ensured.

In addition, forming the wedge-shaped protrusions 42 with the rotor 14 makes it possible to align the permanent magnets 15 with the protrusions 42 with a high accuracy, without errors arising from the assembling work; and thus, that way of forming is useful to materialize the analysis results in an actual product. In particular, in a field of subtle techniques required for an achievement of a cogging torque of less than 1.5 Nm, it is important to reproduce the analysis results in an actual product. The abovementioned configuration in which the wedge-shaped protrusions 42 are formed integrally with the rotor 14 is advantageous in reducing the cogging torque.

Heretofore, one embodiment of the present disclosure has been described; however, the present disclosure is not limited to it, but encompasses other configurations as appropriate modifications thereof. For example, an in-wheel motor 1 in the abovementioned embodiment is one example, and may be modified without departing from a configuration of an outer-rotor type.

REFERENCE SIGNS LIST

1 In-wheel motor
2 Wheel
14 Rotor
15 Permanent magnet
30 Stator
31 Coil
35 Tooth
36 Slot
42 Wedge-shaped protrusion
43 Chamfer
44 Engagement portion

What is claimed is:

1. An in-wheel motor of an outer-rotor type for driving a wheel of an in-wheel motor vehicle having the motor incorporated in the wheel, comprising:
   a rotor of a surface permanent magnet type, wherein a plurality of permanent magnets are fixed along an inner circumferential surface of the rotor;
   wedge-shaped protrusions for fixing the permanent magnets on the rotor; and
   a stator disposed inside the rotor, wherein teeth and slots are alternately formed on an outer circumferential portion of the stator;
   wherein a number of the permanent magnets is 32, and a number of the slots is 24, and wherein in a cross-section of the permanent magnets perpendicular to a rotary axis of the rotor, each corner of the permanent magnets has a chamfer on each of ends so that a magnetic flux cannot concentrate, and the cross-section of the permanent magnets has a convex curved toward the stator at an inner side of the permanent magnets.

2. The in-wheel motor according to claim 1, wherein the in-wheel motor satisfies the following Expression 1:

$$920 \leq \sqrt[3]{Mw} \times \sqrt[3]{Tw} \times Ri^2 \times \sqrt[8]{SinMa} \times \frac{1}{100} \leq 932 \qquad \text{[Expression 1]}$$

where, Mw is a half width of each of the permanent magnets in millimeters; Tw is a half width of each of the teeth in millimeters; Ri is an inside radius of the rotor in millimeters; and Ma is an angle between a tangential line on the permanent magnet at a point of contact between the wedge-shaped protrusion and the permanent magnet, and a bottom on the rotor side of the permanent magnet, in a cross-sectional shape of the permanent magnet along the direction perpendicular to the rotary axis of the rotor.

3. The in-wheel motor according to claim 2, wherein the wedge-shaped protrusions are formed integrally with the rotor.

4. The in-wheel motor according to claim 1, wherein each of the permanent magnets engages with the wedge-shaped protrusion on an end side thereof from a position of the chamfer.

5. An in-wheel motor of an outer-rotor type for driving a wheel of an in-wheel motor vehicle having the motor incorporated in the wheel, comprising:
   a rotor of a surface permanent magnet type, wherein a plurality of permanent magnets are fixed along an inner circumferential surface of the rotor;
   wedge-shaped protrusions for fixing the permanent magnets on the rotor; and
   a stator disposed inside the rotor, wherein teeth and slots are alternately formed on an outer circumferential portion of the stator;
   wherein a number of the permanent magnets is 32, and a number of the slots is 24,
   wherein each of the permanent magnets has a chamfer on each of the ends so that a magnetic flux cannot concentrate, and is convex toward the stator, in a cross-section perpendicular to a rotary axis of the rotor, and
   wherein the in-wheel motor satisfies the following Expression 1:

$$920 \leq \sqrt[3]{Mw} \times \sqrt[3]{Tw} \times Ri^2 \times \sqrt[8]{SinMa} \times \frac{1}{100} \leq 932 \qquad \text{[Expression 1]}$$

where, Mw is a half width of each of the permanent magnets in millimeters; Tw is a half width of each of the teeth in millimeters; Ri is an inside radius of the rotor in millimeters; and Ma is an angle between a tangential line on the permanent magnet at a point of contact between the wedge-shaped protrusion and the permanent magnet, and a bottom on the rotor side of the permanent magnet, in a cross-sectional shape of the permanent magnet along the direction perpendicular to the rotary axis of the rotor.

6. The in-wheel motor according to claim 5, wherein the wedge-shaped protrusions are formed integrally with the rotor.

\* \* \* \* \*